J. CHAPMAN.
Reversible Gang-Plows.
No. 212,897.  Patented Mar. 4, 1879.
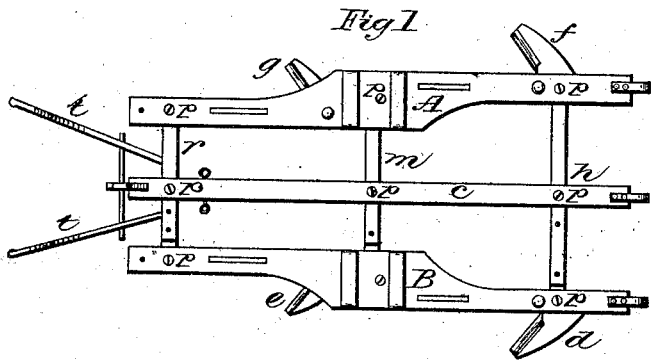
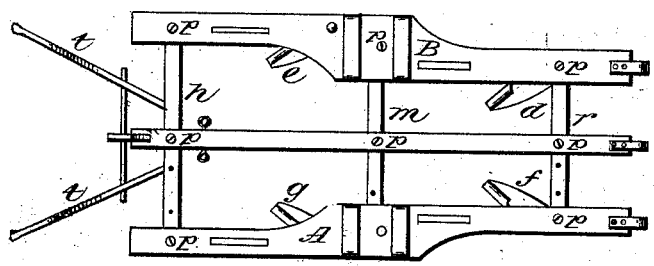
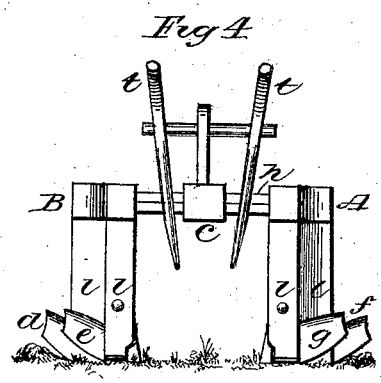
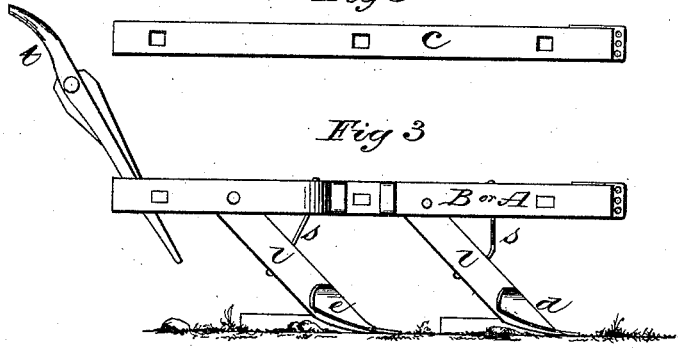
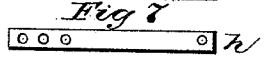
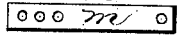
Attest:
H. A. Gaston
S. P. Scanister
Inventor:
J. Chapman
By H. J. Ennis
Atty

UNITED STATES PATENT OFFICE.

JEREMIAH CHAPMAN, OF VIRGINIA CITY, NEVADA.

IMPROVEMENT IN REVERSIBLE GANG-PLOWS.

Specification forming part of Letters Patent No. 212,897, dated March 4, 1879; application filed February 25, 1878.

*To all whom it may concern:*

Be it known that I, JEREMIAH CHAPMAN, of Virginia City, county of Storey, and State of Nevada, have invented a new and useful Reversible Gang-Plow for the cultivation of cotton and corn, and other plants and cereals which are planted or cultivated in rows; and I do declare that the following is a full, clear, and sufficiently exact description of my invention, reference being had to the accompanying drawings, in which—

Figure 1 is a top or plan view of my novel reversible gang-plow in proper position for the siding off of cotton or corn, throwing the furrows from the rows. Fig. 2 is a like top or plan view of the same, the plows and the proper parts of the frame being reversed for the purpose of throwing the furrows toward the rows. Fig. 3 is a side view of my gang-plow. Fig. 4 is a front-end view of my plow when in the position represented by Fig. 1. Fig. 5 is a side view of the middle beam of my plow, represented by C in Figs. 1, 2, and 4. Fig. 6 is a side view of one of the double or overlapping bars or slats $h$. Fig. 7 is a top view of the same. Fig. 8 is a top view of one of the double bars $m$. Fig. 9 is a top view of the double bars or slats $r$.

The same letters refer to like parts of the plow in all the figures, in which—

A represents one of the side beams or bars of the plow. B represents its corresponding outer beam. These outer beams are not only made exactly alike, but if each beam was severed at its center each half-beam would be like every other half—that is, they would all coincide in their exterior lines. By this construction of the beams A and B, I am enabled to reverse the relative position of every part of the plow by changing these beams from one side of the plow to the other, as shown in Figs. 1 and 2. C represents its middle bar or plain beam, and is never reversed. $d$ represents the mold-board of one of the front plows, and $f$ represents its corresponding opposite plow or mold-board. $e$ represents part of the mold-board of one of the rear plows, and $g$ represents its corresponding opposite. $h$ represents one of the front and (when reversed) one of the rear double slats which bind A, B, and C together. $m$ represents one of the middle pair of slats used for the like purpose, and $r$ represents one of the rear pair of slats, (and when the plows are reversed the front slats,) which bind the beams of the plow in their proper places. These novel slats I always make of flat bar-iron, and I also make the beams and the standards $l\ l$, &c., of either iron or wood, as desired.

Each beam is provided with a clevis or convenient attachment, as represented in the figures, or as desired.

$l$ represents the standards carrying the plows, and $s$ represents rods extending from the beams A and B into and through the standards $l$ for their support. $p$ represents bolts through the beams A, B, and C, and through the pairs of slats $h$, $m$, and $r$, which slats are laid, respectively, each over its fellow slat; and $t\ t$ represent the handles of the plow.

The mortises through C are twice as deep as those through A and B, and are made just large enough to receive the pairs of slats $h$, $m$, and $r$, one above the other, while the mortises through A and B will receive only one of the slats, the slats lapping each other through C, and extending toward the opposite beam from that to which it is attached.

The beams A and B, if of wood, I make of material of such width, and if of iron I cause to bend to such width as I desire the width of the furrows to be made by the plows to be, so that the rear plows will throw their soil respectively into the furrows cut by their preceding plows.

I use plows of any form desired; but I prefer the plows with point and mold-board, as represented in the figures, and I make them of different sizes and of different heights, as may be desired.

To explain the operation of my plow, we will suppose that the field of cotton or of corn has been once plowed with my plow in its form represented by Figs. 1 and 4, and that the furrows on each side of the row have been turned away from the rows. It is desirable at the second plowing to turn the furrows toward the rows. To do this the several bolts $p$ are taken out, and the beams A and C are drawn off from the bars or slats $h$, $m$, and $r$. The beam C is taken over to the opposite of B, and the beam A is also carried over to the opposite side of B, and beyond C to a proper distance.

The bars $h$ are carried back and inserted through the mortises through C and one end of the bars into the mortise in B, and an end of the slat into A, taking care that the slat which was on the top when the plow was in the form represented in Fig. 1 is placed beneath the other slat when the plow is placed in the form represented in Fig. 2, and this is the case with all the slats on reversing the position of the plows. In like manner the two slats $r$ are brought from the rear end of the frame and placed in the lead of the slats, remembering that the slat which was on the top when in the rear is placed beneath when in front.

We have now, by this novel manner of reversing the position of parts of the plow-frame, reversed the position of the plows with respect to each other, by which novel method the mold-boards which, in Figs. 1 and 4, turned the furrows away from the row, will now turn their furrows toward the same row. I provide the bars or slats $h$, $m$, and $r$, and their mates beneath them, with holes at proper intervals, and also bolts to pass through the same, in order to draw the beams A and B with their plows respectively nearer together, or to set them wider apart, as convenience or the desire of the operator may require.

I am aware that it is not new to connect three beams by cross-slats, nor is it new to arrange the outer beams flaring or make them adjustable or reversible, and I do not claim such to be my invention; but What I do claim as new and useful, and desire to secure by Letters Patent of the United States, is—

In a reversible gang-plow, the combination of the central beam, C, and double cross-slats $h$, $m$, and $r$ with the reversible beams A B, constructed as shown and described, and parallel to the beam C, as and for the purpose set forth.

J. CHAPMAN.

Witnesses:
H. A. GASTON,
S. P. SCANIKER.